United States Patent
Krause et al.

(10) Patent No.: US 8,335,440 B2
(45) Date of Patent: Dec. 18, 2012

(54) METHOD, SYSTEM, AND APPARATUS FOR BLIND EQUALIZATION OF BPSK SIGNALS

(75) Inventors: David J. Krause, Nepean (CA); Han Henry Sun, Ottawa (CA); John D. McNicol, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 380 days.

(21) Appl. No.: 12/791,223

(22) Filed: Jun. 1, 2010

(65) Prior Publication Data

US 2011/0293289 A1   Dec. 1, 2011

(51) Int. Cl.
*H04B 10/06* (2006.01)
*H04B 10/148* (2006.01)

(52) U.S. Cl. ......... 398/208; 375/235; 375/350; 708/323

(58) Field of Classification Search .......... 398/208–211; 375/235, 350; 708/323
See application file for complete search history.

(56) References Cited

U.S. PATENT DOCUMENTS

2011/0142449 A1*   6/2011   Xie ................................. 398/65

* cited by examiner

*Primary Examiner* — Leslie Pascal
(74) *Attorney, Agent, or Firm* — David L. Soltz

(57) ABSTRACT

A system, method, and apparatus is disclosed for enabling a constant modulus algorithm (CMA) to be reliably used for blind equalization training of an equalizer. According to one embodiment, received signals in a binary phase shift keying (BPSK) format are converted to a quadrature phase shift keying (QPSK) format, to which CMA processing can be reliably applied for equalization. According to another aspect of this embodiment, the equalized QPSK signals are rotated to convert the signals to an equalized BPSK format for output.

23 Claims, 7 Drawing Sheets

METHOD, SYSTEM, AND APPARATUS FOR BLIND EQUALIZATION OF BPSK SIGNALS

FIELD

The present disclosure relates generally to optical communication networks, and in particular to a method, system, and apparatus for blind equalization of BPSK signals.

BACKGROUND

Optical communication systems are known in which optical signals carrying data are transmitted from a first node to a second or receive node over an optical fiber. At the receive node, the optical signals are converted into corresponding electrical signals, which are then further processed.

The receive node typically includes a receiver. One type of receiver used is a coherent receiver. In the coherent receiver, the received signal is mixed with an output of a local oscillator (LO) in an optical hybrid circuit, the outputs of which are made incident on photodetectors to generate analog electrical output signals. The analog signals are sampled at a sample rate by analog-to-digital converter (ADC) circuits configurable to supply outputs for further processing by a Digital Signal Processor (DSP), for example. Thus, for the coherent receiver, the amplitude, phase, and state of polarization of the optical signal are all transferred to the electrical domain for digital signal processing in the DSP.

The optical signals may be subject to various impairments including chromatic dispersion (CD) and polarization mode dispersion (PMD), etc. CD is due to various frequency components in each signal traveling at different velocities. PMD is due to various polarization components in each signal traveling at different velocities. As a result of the impairments, the in-phase (I) and quadrature (Q) components of electronic signals representative of data carried by the optical signals may have different delay, frequency response, and polarization characteristics. Such differences may be resolved and both CD and PMD compensation can be achieved electronically using an equalizer in the receiver.

The equalizer may be a finite-impulse response (FIR) digital filter, for example. Such filters include inputs or taps, and symbols are transferred from one tap to the next, multiplied by a coefficient at each tap, and the resulting products are summed. Typically, the coefficients are selected based on parameters, such as estimates of CD, PMD, etc., and such estimates may be obtained by "training" the equalizer. According to one known method of training, the transmit node sends a known training sequence of bits or periodically inserts a known sequence of bits in the transmitted signal at certain intervals and transmits the signal to the receiver. The receiver recognizes the known training sequence and uses it to train the equalizer using known methods.

A disadvantage of sending a known sequence of bits during start up of an optical communication system is the requirement for an external control between the transmitter and receiver nodes, which increases complexity of the system. A further disadvantage of periodically inserting a known sequence of bits in the transmission signal is that the insertion increases the overall bit rate. An increase in the overall bit rate typically requires higher bandwidth components which increases cost.

An alternative method for training which does not include sending or inserting a known sequence of bits is known as "blind equalization". According to the blind equalization method, the training is performed as a function of the measuring of the actual received signal output from the equalizer.

One known blind equalization method is a constant modulus algorithm (CMA). (For ready reference, CMA as used herein to refer to "the constant modulus algorithm"). This algorithm is also referred to as the Godard algorithm since its origin is from a reference authored by Godard (IEEE Transactions on Communications, Vol. COM-28, No. 11, 1980, pp. 1867-1875). In accordance with CMA, filter coefficients are selected through an iterative process ("training"), whereby a cost function is associated with the modulus or magnitude of signals output from the equalizer are equalized to a fixed value (e.g., 1). CMA is effective in training filters to provide equalization of signals that have a certain type of symmetry, i.e., $E\{a_n^2\}=0$, where E is the expectation and $a_n$ are the data symbols. Such signals include quadrature phase shift keying (QPSK) modulated signals, in which signal phase is modulated to have one of four values separated from one another by 90°. For polarization multiplexed signals, methods such as the one reported by Vgenis (IEEE Photonics Technology Letters, Vol. 22, No. 1., 2010, pp. 45-47) can be added to train each of the equalizers for each polarization.

In some known systems, the equalizer receives signals indicative of a binary phase shift keying (BPSK) modulation format in which data is conveyed by modulating the signal phase to have one of two phases separated by 180°. For the BPSK format, $a_n$ in the above equation takes on values of +1 or −1 with a probability of 1/2. Consequently, the formula $E\{a_n^2\}$ for BPSK evaluates to 1, not 0. Thus, in practice, if CMA is used in connection with a BPSK signal, the trained output of the equalizer may or may not be BPSK. What is needed, therefore, is a method, system, and apparatus that will enable CMA to be used reliably for blind equalization, including for systems where BPSK modulation is employed.

SUMMARY

Consistent with an aspect of the present disclosure, broadly stated, an apparatus is provided comprising a finite impulse response (FIR) filter circuit configured to successively supply a plurality of symbols; a calculation circuit configured to provide a plurality of coefficients to the FIR filter circuit, the calculation circuit calculating the plurality of coefficients in accordance with a Constant Modulus Algorithm (CMA) and in response to first and second inputs to the calculation circuit, the first input including a first group of the plurality of symbols, and the second input being a plurality of sums; and an adder circuit configured to supply the plurality of sums to the calculation circuit, the adder circuit generating the plurality of sums by adding each kth symbol of a second group of the plurality of symbols to a product of each (k−1)th symbol times a number, where k is an integer greater than or equal to 2 and greater than or equal to n, and n is a number of symbols in the second group of the plurality of symbols.

Consistent with another aspect of the present disclosure, broadly stated, a method is provided comprising successively supplying a plurality of symbols from a finite impulse response (FIR) filter; calculating a plurality of coefficients in accordance with a Constant Modulus Algorithm (CMA) and in response to first and second inputs, the first input including a first group of the first plurality of symbols, and the second input being a plurality of sums; and generating the plurality of sums by adding each kth symbol of a second group of the plurality of symbols to a product of each (k−1)th symbol times a number, where k is an integer greater than or equal to 2 and greater than or equal to n, and n is a number of symbols in the second group of the plurality of symbols.

Consistent with another aspect of the present disclosure, broadly stated, a system is provided comprising a transmitter configured to supply an optical signal; a receiver configured to receive the optical signal, the receiver including a photodiode that converts the optical signal to an electrical signal; an analog-to-digital converter circuit configured to receive the electrical signal and supply a first plurality of symbols; a finite impulse response (FIR) filter circuit configured to successively supply a second plurality of symbols based on the first plurality of symbols; a calculation circuit configured to provide a plurality of coefficients to the FIR filter circuit, the calculation circuit calculating the plurality of coefficients in accordance with a Constant Modulus Algorithm (CMA) and in response to first and second inputs to the calculation circuit, the first input including a first group of the second plurality of symbols, and the second input being a plurality of sums; and an adder circuit configured to supply the plurality of sums to the calculation circuit, the adder circuit generating the plurality of sums by adding each kth symbol of a second group of the second plurality of symbols to the product of each (k−1)th symbol times a number, where k is an integer greater than or equal to 2 and greater than or equal to n, and n is a number of symbols in the second group of the second plurality of symbols.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the present disclosure and together with the description, serve to explain the principles of the present disclosure.

DESCRIPTION OF THE EMBODIMENTS

According to one aspect of the present disclosure, a blind equalization is implemented in a manner to enable more reliable use of CMA. According to another aspect, the equalizer is receiving signals indicative of a BPSK format.

An advantage of the present disclosure is to enable the equalizer of a coherent receiver to reliably and efficiently be trained using blind equalization. Another advantage provided by at least one aspect of the present disclosure is to enable reliable use of CMA for blind equalization when the transmitted signal is modulated in accordance with a BPSK modulation format.

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
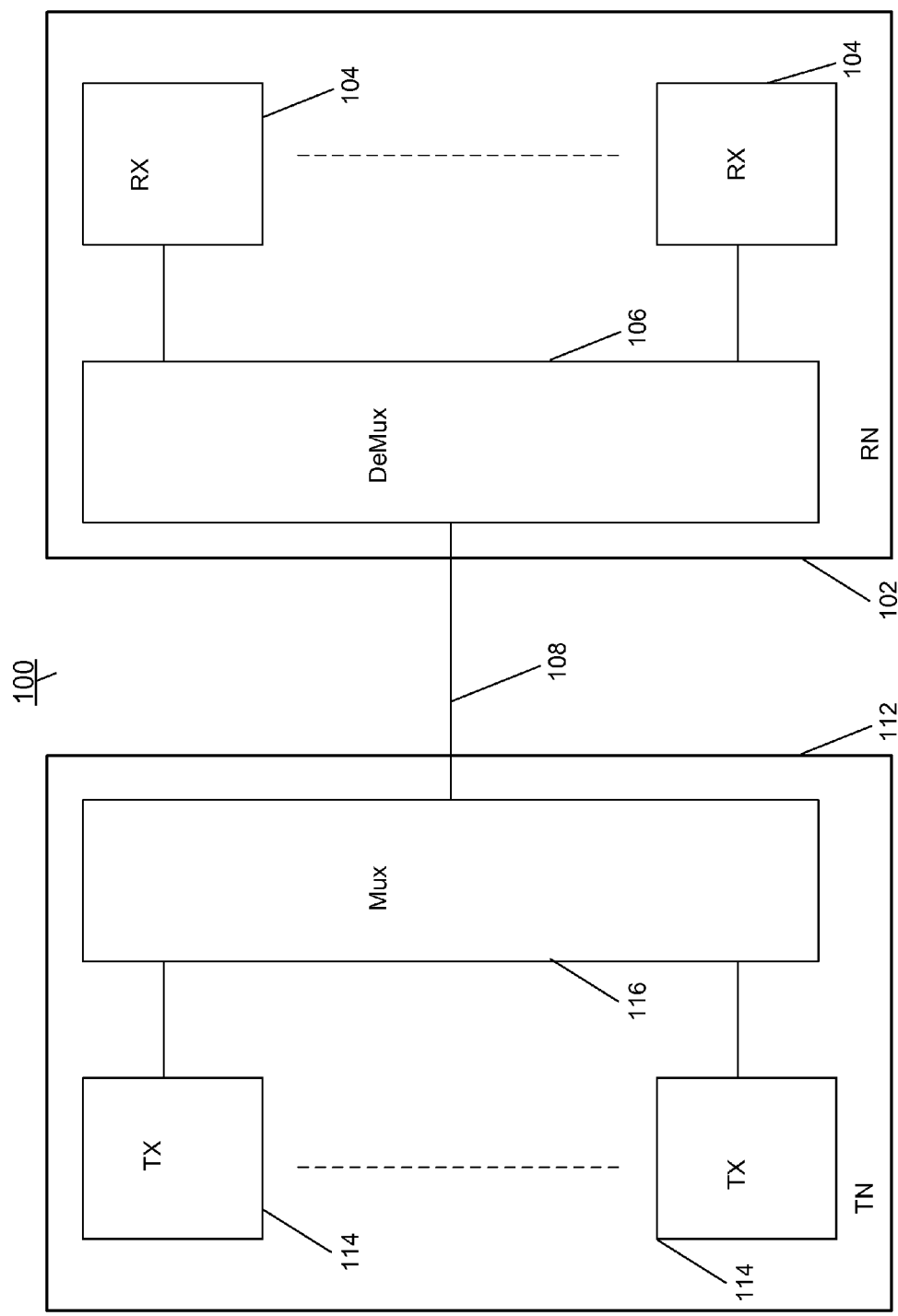
FIG. 1 is a block diagram illustrating a system for transmitting and receiving of optical signals.

FIG. 1 is a block diagram illustrating a system 100 for transmitting and receiving of optical signals. System 100 includes a Transmit Node (TN) 112 that includes a plurality of optical transmitters (TX) 114, each TX 114 converting an electrical signal to an optical signal having one of a plurality of wavelengths. Each TX 114 is coupled to a Multiplexer (Mux) 116 that combines the optical signals onto an optical fiber medium, identified as line 108 in FIG. 1. The combined optical signals constitute a wavelength division multiplexed (WDM) optical signal that is supplied to a Receive Node (RN) 102, which receives and demultiplexes the WDM optical signal with a demultiplexer (Demux) 106, which supplies each optical signal to each of a corresponding one of a plurality of receivers (RX) 104. Each of receivers 104 may constitute a coherent receiver, as discussed in greater detail below with reference to FIG. 2.

Figure 2:
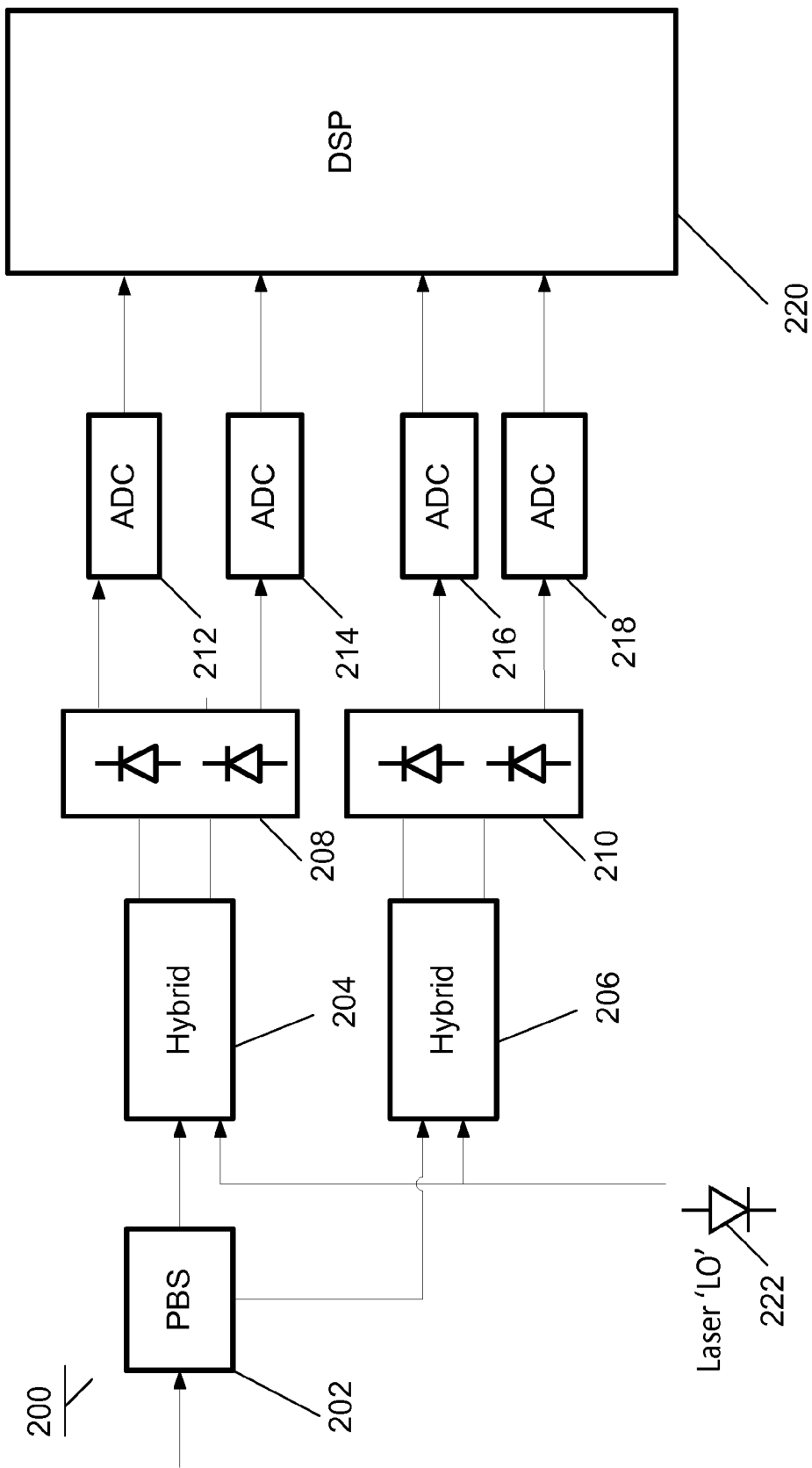
FIG. 2 is a block diagram illustrating a coherent receiver according to an embodiment of the present disclosure.

FIG. 2 is a block diagram illustrating a coherent receiver 200 according to an embodiment of the present disclosure. The coherent receiver 200 detects not only the amplitude of the optical signal, but also its phase and polarization. In one example, a polarization multiplexed optical signal is supplied to receiver 200. In that case, receiver 200 may include a polarization beam splitter (PBS) 202 operable to receive the input optical signal and to separate the signal into orthogonal polarizations, also referred to as X and Y polarizations; i.e., vector components of the optical E-field. The orthogonal polarizations are then mixed with a laser local oscillator (LO) 222 reference through optical hybrid circuits 204, 206. Each of optical hybrid circuits 204, 206, in turn, outputs two signals, representing the in-phase and quadrature components of the optical E-field on X and Y polarizations. The signals output from optical hybrid circuits 204, 206 are made incident on respective photodiodes in a set of photodetectors 208, 210, to generate four analog electrical output signals.

The four output signals from the photodiodes or photodetectors 208, 210 comprise four base-band analog electrical signals linearly proportional to the in-phase and quadrature components of the optical E-field on X and Y polarizations. The analog signals are then sampled at a sample rate by respective analog-to-digital converter (ADC) circuits 212, 214, 216, 218, each coupled to a corresponding one of the photodiodes of photodiode pair 208. Each of the ADC circuits 212, 214, 216, 218 is configurable to supply a corresponding one of a plurality of digital signals to a Digital Signal Processor (DSP) 220.

According to the present disclosure, the DSP 220 includes circuits for performing a blind equalization method in which training for the equalizer is performed as a function of measuring the actual received signal output from the equalizer.

Figure 3:
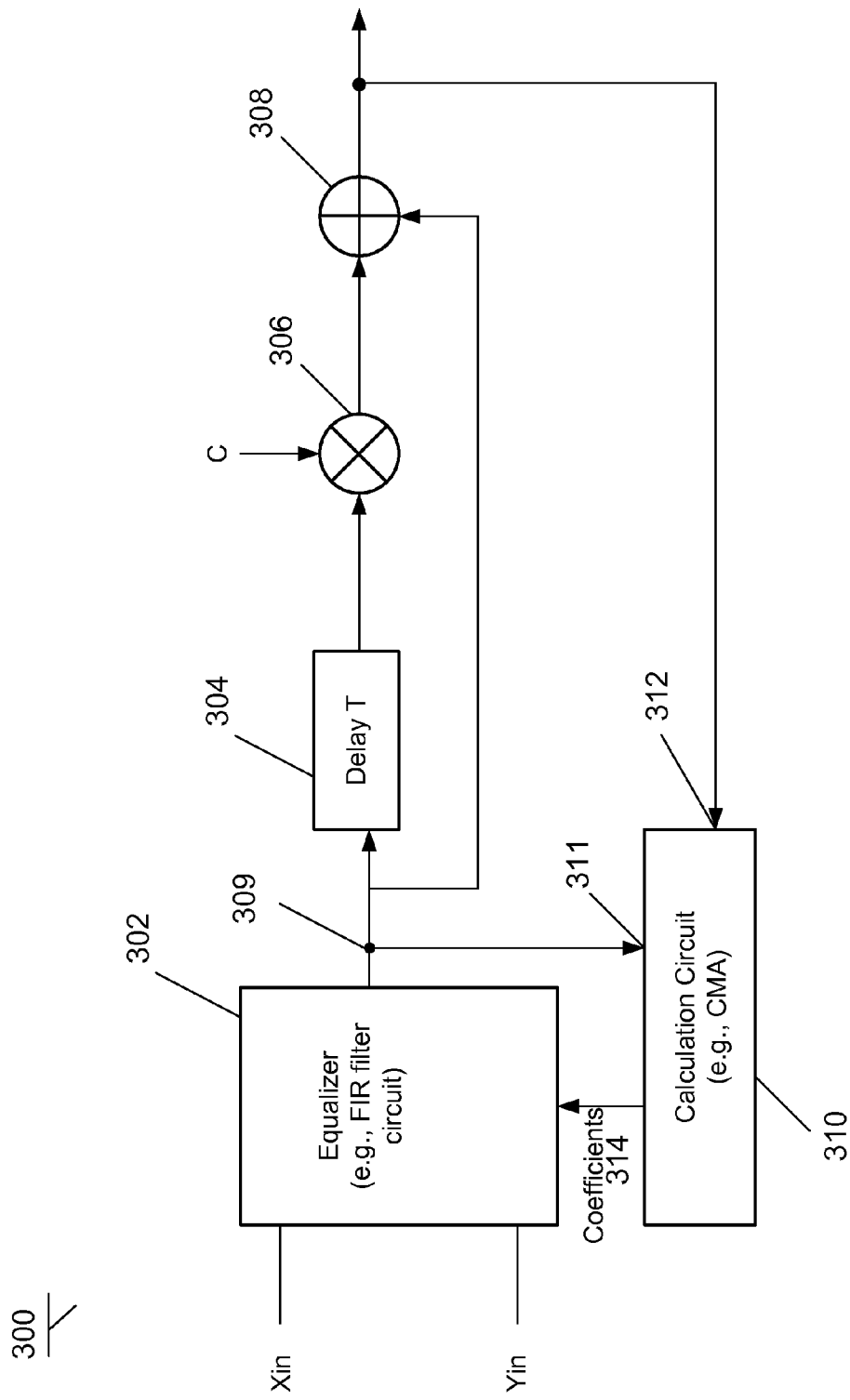
FIG. 3 is a block diagram illustrating an apparatus for blind equalization in the DSP of the coherent receiver according to an embodiment of the present disclosure.

FIG. 3 is a block diagram illustrating an apparatus 300 for blind equalization in the DSP of the coherent receiver according to an embodiment of the present disclosure. The apparatus 300 includes an equalizer 302 (e.g., a Finite Impulse Response (FIR) filter circuit), a calculating circuit 310 (e.g., CMA), a delay T circuit 304, a multiplier circuit 306, and an adder circuit 308. The calculating circuit has two inputs, a first input 311 and a second input 312, and supplies coefficients 314 to the equalizer 302. The first input 311 is supplied by the equalizer 302 and the second input 312 is supplied by the adder circuit 308. Two inputs, Xin and Yin, are supplied to the equalizer 302. The two inputs, Xin and Yin, may be supplied from ADCs 212 and 214, for example, for providing equalization in connection with polarized signals output from one port of PBS 202. It is understood that similar circuitry shown in FIG. 3 may be provided in order to achieve equalization in connection with polarized signals output from the other port of PBS 202.

The output of the equalizer 302 is supplied both to the delay T circuit 304 and to the adder circuit 308. The output of the delay T circuit 304 is supplied to the multiplier circuit 306 where it is multiplied by a complex number "c". The resulting product is supplied to the adder circuit 308 in which the product is added to the output from the equalizer 302. The output of the adder circuit 308 is supplied to the second input 312 of the calculation circuit 310.

In the example in FIG. 3, the equalizer 302 is a FIR filter circuit having filter coefficients. Thus, the equalizer 302 in this example is also referred to as FIR filter circuit 302, or equalizer (FIR filter circuit) 302 herein.

In operation, the two inputs Xin and Yin are supplied to the FIR filter circuit 302. In response to these inputs, equalizer 302 outputs a first series of symbols. In one example, each symbol is successively supplied to input 311 of calculation circuit 310, which, in turn, calculates a set of coefficients 314 in response to each received symbol and in accordance with CMA. For convenience, such initial calculations of coefficients 314 are referred to herein as "CMA1".

After a predetermined period of time, for example, each of a second series of symbols output from equalizer 302 is supplied to delay circuit 304, which delays each symbol by a time period T equal to the time required to output a symbol from equalizer 302, for example. Thus, where the output of the equalizer circuit 302 is a kth symbol, the output of the delay circuit T 304 is the kth symbol delayed one symbol, i.e., the (k−1)th symbol (k is an integer that is greater than or equal to 2 and greater than or equal to n, a number of symbols in the second series of symbols). The (k−1)th symbol from the delay T circuit 304 is supplied to the multiplier circuit 306 where it is multiplied by a complex number "C". The resulting series of products is supplied to the adder circuit 308.

The adder circuit 308 adds each product to a corresponding kth symbol output from equalizer 302 to generate a series of sums, which are supplied to input 312 to calculation circuit 310. In response to each sum and in accordance with CMA, calculation circuit 310 supplies a set of coefficients to 314 equalizer 302. Such subsequent generation of coefficients based on the outputs of adder 308 is referred to herein as CMA2.

Figure 6:
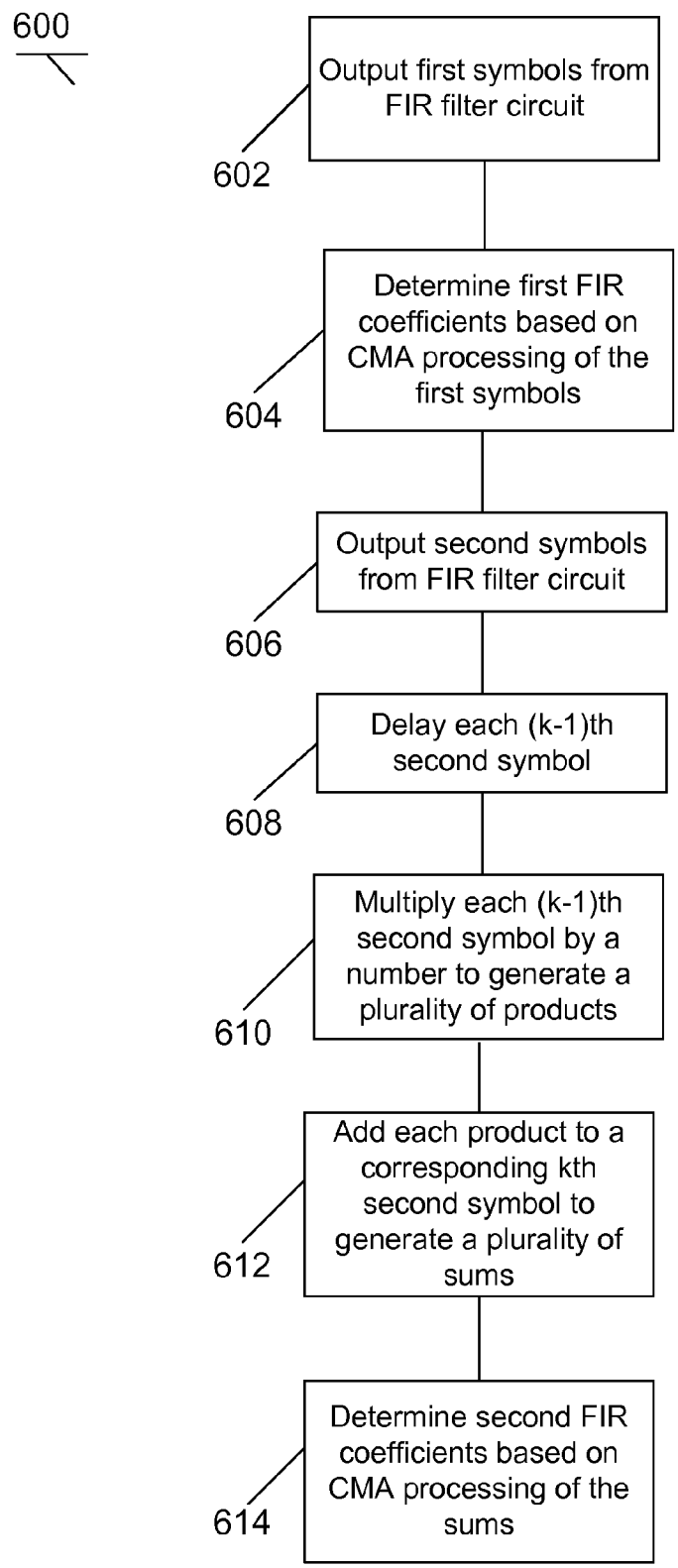
FIG. 6 is a diagram further illustrating exemplary steps of aspects of the blind equalization process according to the present disclosure.

FIG. 6 illustrates a flowchart in connection with a method consistent with an additional aspect of the present disclosure. In Step 602 of the method, the first series of symbols is output from the FIR filter circuit 302 as an initial step of CMA1. According to one aspect, the first series of symbols may include a predetermined number of symbols, such that CMA1 is carried out for a predetermined period of time. As noted above, the output of FIR filter circuit 302 is supplied to the first input 311 of the calculation circuit 310 during such predetermined time period. In Step 604, first FIR coefficients 314 to be supplied by the calculation circuit are determined based on CMA processing of the first series of symbols and successively output to FIR filter circuit 302.

In accordance with an alternative aspect of the present disclosure, CMA1 may be carried out until, for example, error values associated with the outputs form FIR filter circuit 302 are equal to or fall below a threshold value, or the number of calculation iterations has exceeded some defined number. That is, the calculation circuit 310 generates each of a plurality of error values based on a corresponding symbol in the first series of symbols supplied FIR filter circuit 302. CMA1 is then carried out while the plurality of error values is greater than a threshold error value. Once an error value is equal to or less than a predetermined threshold, CMA1 is stopped and CMA2 is then performed. According to this aspect, i.e., stop CMA1 when the error value is less than or equal to a threshold value. Alternatively, CMA1 operates for a certain number of iterations.

Steps 606-614 are associated with CMA2. In Step 606, the second series of symbols are output from the FIR filter circuit 302. Next, in Step 608, each kth symbol of the second series is delayed, e.g., by the delay T circuit 304 in FIG. 3 to give (k−1)th symbols, and is . is multiplied by a number, e.g., "C" in FIG. 3, to generate a series of products (step 608). In Step 612, each product is added to a corresponding kth second symbol (e.g., supplied by the FIR filter circuit 302 in FIG. 3) to generate a plurality of sums, and, in Step 614, second (set of) FIR coefficients 314 are determined based on CMA processing of the sums in FIR filter circuit 302.

CMA2 may be carried out for a predetermined amount of time, i.e., over a predetermined number of iterations. Alternatively, CMA2 may be performed until error values calculated by calculation circuit 310 based on the output of FIR filter 302 are less than or equal to a threshold value.

According to one embodiment, once CMA2 is completed, training of the equalizer/FIR filter circuit 302 is completed and the receiver can transition to a general operation mode.

In the above example, CMA1 is performed before CMA2. In accordance with alternative embodiment, CMA1 may be carried out after CMA2. In addition, CMA1 and CMA2 may be carried out simultaneously.

Figure 4:
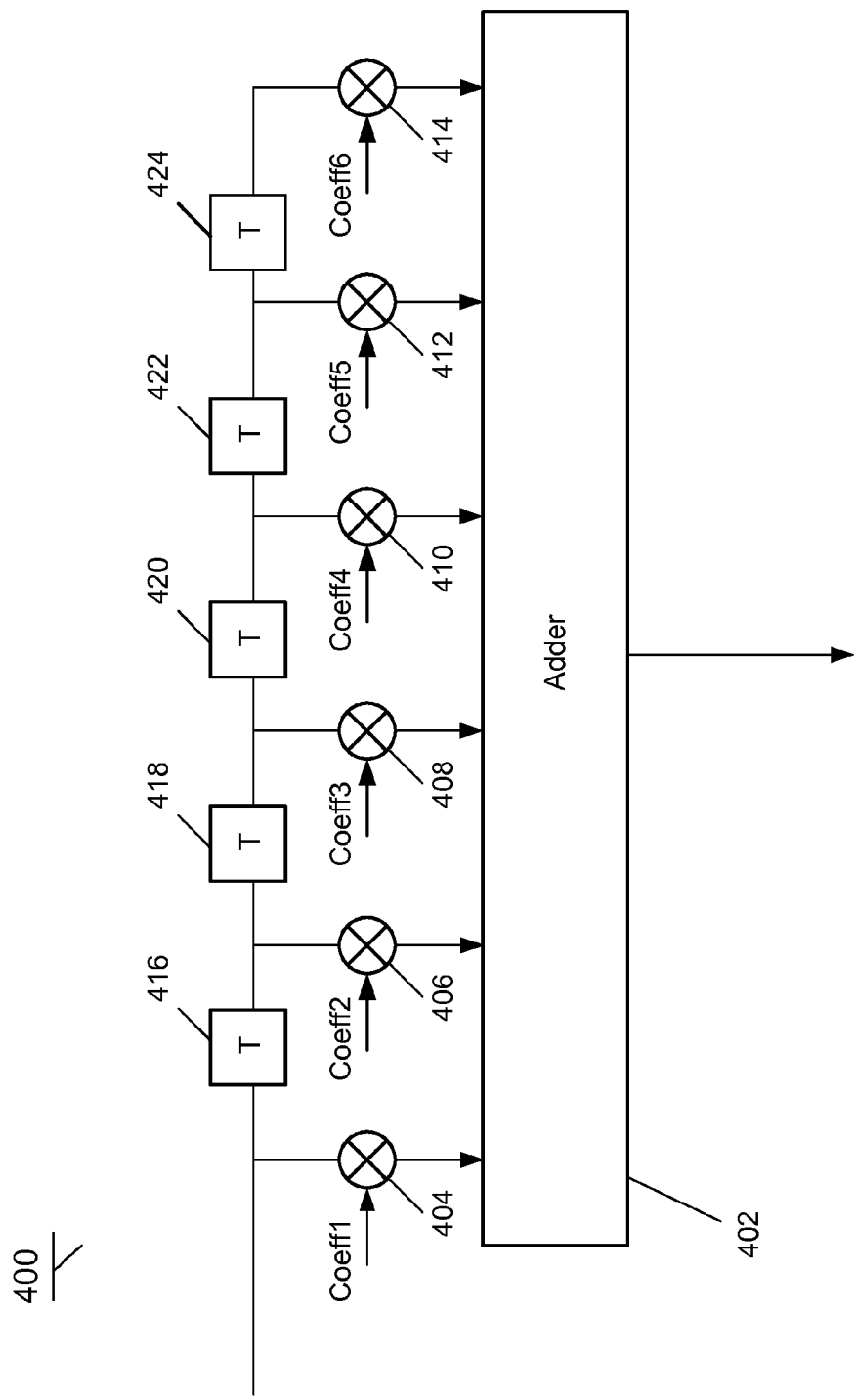
FIG. 4 is a block diagram illustrating an exemplary 6-tap FIR filter structure according to an embodiment of the present disclosure.

FIG. 4 is a block diagram illustrating an exemplary 6-tap FIR filter structure 400 according to an embodiment of the present disclosure. The FIR filter circuit 400 is an exemplary embodiment of the equalizer (FIR filter circuit) 302 in FIG. 3. The FIR filter 400 includes multipliers 404, 406, 408, 410, 412, and 414 for each input or tap of FIR filter 400, tap delays 416, 418, 420, 422, and 424, filter coefficients Coeff0, Coeff1, Coeff2, Coeff3, Coeff4, Coeff5 and Coeff6, and an adder 402.

In the example shown in FIG. 4, it is assumed that an input signal Xin (FIG. 3) is supplied to a corresponding input or tap of FIR filter 400 to a corresponding multiplier 504, where Xin is a complex number. The signal Xin is delayed repeatedly by tap delays 416, 418, 420, 422, and 424. As shown in FIG. 4, the output of each tap delay 416, 418, 420, and 422 is provided to a successive tap delay, which adds a symbol delay to the corresponding input or tap, which inputs are multiplied by the corresponding FIR coefficients Coeff2, Coeff3, Coeff4, and Coeff5 by respectively multiplier circuits 406, 408, 410, and 412. The output of tap delay 424 is multiplied with Coeff6 by multiplier circuit 414. The resulting products from multipliers 404, 406, 408, 410, 412, and 414 are then summed by adder 402 to yield the output of the FIR filter 400.

Further details regarding the operation of the circuitry shown in FIG. 3 will next be described.

The update equations for the coefficients supplied to equalizer (FIR filter circuit) 302 are derived by taking the partial derivative with respect to the filter coefficients of the cost function for the output of the equalizer (FIR filter circuit) 302. The cost function for the output is $E\{(|\text{Output}|^2-2)^2\}$; where | | denotes the absolute value. Output=Out+C*Out−1 where "Out" is the output of the equalizer (FIR filter circuit) 302, C is a complex number (discussed below), and −1 denotes the delay. "Out" is calculated from the typical finite impulse response equalizer formula:

Out=$x_{in,n}$*Hxx+$y_{in,n}$*Hyx; where $x_{in,n}$ is the vector of input X values (a 1×n vector), Hxx is a vector of coefficient values (an n×1 vector), $y_{in,n}$ is the vector of input Y values, and Hyx is another vector of equalizer values (a n×1 vector); and the input and coefficient values may be numbers.

The partial derivative of the cost function with respect to the Hxx coefficient values yields the update equation below for the Hxx coefficient values (the updates for the other equalizer coefficient values have a similar form):

$$Hxx(new)=Hxx(old)-\mu*(|Output|^2-2)*Output*conj(x_{in,n}+C*x_{in,n-1})^T \quad (1)$$

where $\mu$ is a constant selected to update the taps, conj( ) is the conjugate, and $^T$ denotes the transpose of the vectors. For this equation, the quantity, $(|Output|^2-2)^2$ may be considered as the error or error value.

C in the equation (1) is the complex number C in FIG. 3 which is multiplied by the output supplied by delay T 304, i.e., the output being the (k−1)th second symbol from the FIR filter 302. Each symbol represents a complex number in the form of I+jQ and has an associated phase angle. By multiplying each symbol (k−1)th symbol by another complex number, C, the resulting product may also be a complex number, but the associated phase of the product may be rotated, e.g., by 90 degrees, if C=j.

The value of C may be held constant, or alternatively, is adjusted to reduce the error at the output of the sum. One method to adjust the angle of C is to calculate the update using the above equation for Hxx(new). If this is done, the update for the angle of C would then be:

$$angle(C)(new)=angle(C)(old)+\mu*(|Output|^2-2)*|Out|*|Out_1|*$$

$$sin(angle(C)(old)+angle(Out_1)-angle(Out)) \quad (2)$$

In addition, if the value of C is adjusted with the update, the updated value can be used to infer the frequency offset between the transmitted signal and the local oscillator (e.g., 222 in FIG. 2). The frequency offset may be estimated from the equation (3) below (within the ambiguity of the angle operator):

$$F\_offset=(angle(C)-\pi/2)/(2*\pi*T). \quad (3)$$

Where T is the symbol time. As noted above, CMA may not be used to determine filter coefficients for the equalization of BPSK modulated signals. Consistent with the present disclosure, however, in CMA2, a delayed symbol (first BPSK data) is effectively rotated (by the multiplication by C) and added to a current symbol (second BPSK data). The constellation associated with the resulting sum, therefore, includes four points (two points associated with the first BPSK data and two points associated with the second BPSK data, which are rotated relative to the first BPSK data). As such, the constellation associated with each sum output from adder 308 resembles the constellation associated QPSK data, and, therefore, has the symmetry for which CMA can adequately calculate appropriate coefficients. After CMA2 has been performed, therefore, coefficients will be calculated such the equalizer 302 has a frequency response whereby the sums output from adder 308 have a four point constellation. Since, as noted above, the four point constellation at the output is effectively the result of the sum of two BPSK constellations that are rotated relative to one another, CMA-based equalization that yields an appropriate four point constellation at the output of adder 308 will create the desired two-point BPSK constellation at the output of equalizer 302. Thus, in the above example, after CMA2 is performed, equalization is complete, and the symbols output from equalizer output 302 may be provided to additional circuitry for further processing.

Figure 5A:
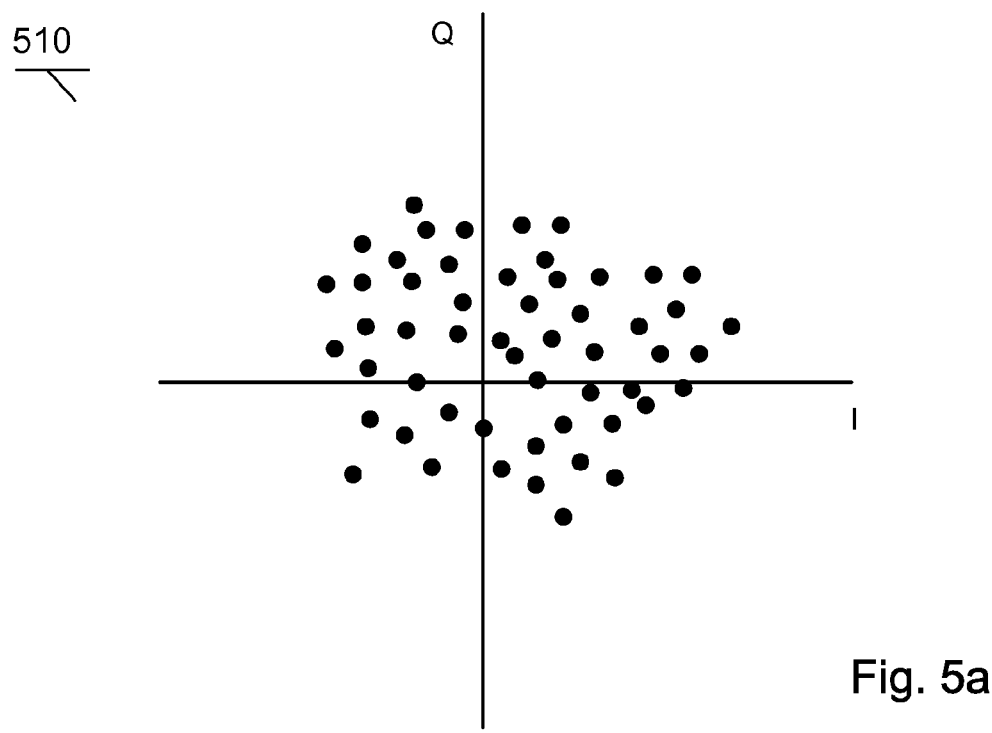
FIG. 5a is a diagram illustrating an exemplary point constellation prior to the blind equalization process according to an aspect of the present disclosure.

Operation of the circuitry shown in FIG. 3 will next be further described with reference to FIGS. 5*a*-5*c*. FIG. 5*a* is a diagram 510 illustrating an exemplary point constellation prior to the blind equalization process according to an aspect of the present disclosure. The constellation in FIG. 5*a* has a plurality of points about I-Q axes and an I-Q origin, each such point has a magnitude relative to the origin and each has a corresponding one of a plurality of phases relative to an axis. The points appear to be randomly distributed about the origin.

Figure 5B:
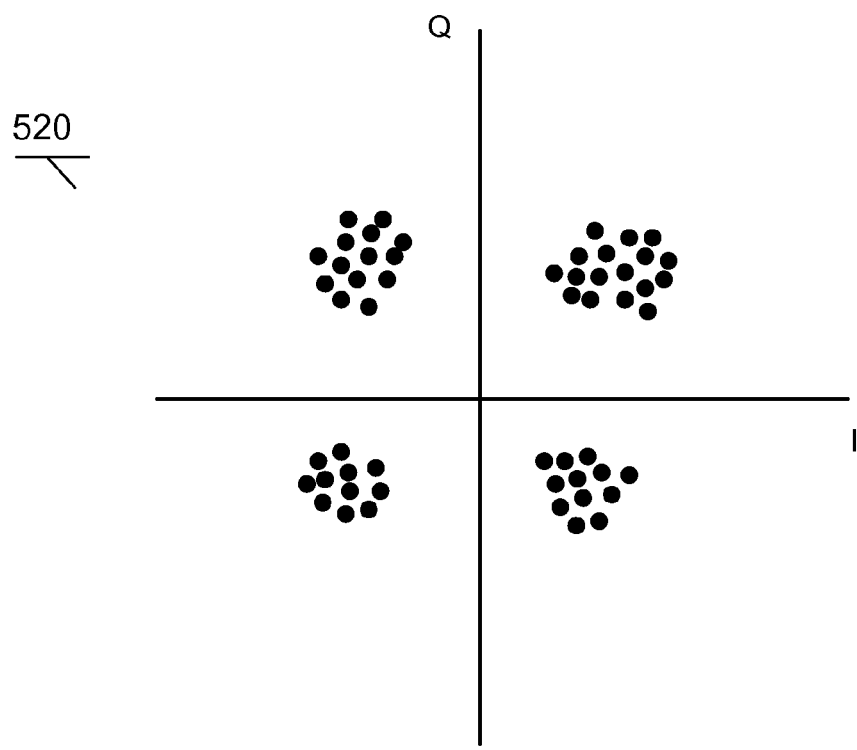
FIG. 5b is a diagram illustrating an exemplary point constellation obtained during the blind equalization process according to an aspect of the present disclosure.

FIG. 5*b* is a diagram 520 illustrating an exemplary signal point constellation at the output of adder 308 after CMA2 has been performed. As can be seen, the constellation points in FIG. 5*b* are clustered in each quadrant, with the differences between quadrant clusters being substantially equal to $\pi/4$ radians, i.e., essentially equi-spaced around a circle and resembling a constellation associated with a QPSK modulated signal.

Figure 5C:
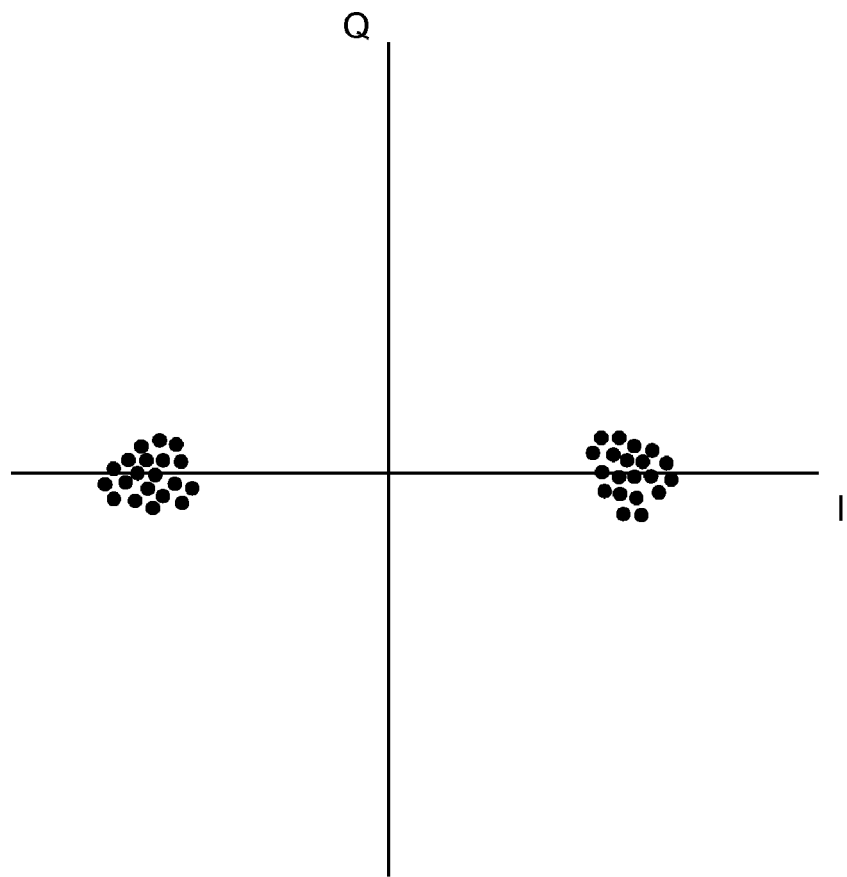
FIG. 5c is a diagram illustrating an exemplary resultant BPSK signal constellation obtained in accordance with the blind equalization process according to an aspect of the present disclosure.

FIG. 5*c* illustrates a constellation associated with the output of equalizer 302 after CMA2. As noted above, operation by CMA2 to yield the constellation shown in FIG. 5*b* (a four point QPSK constellation) results in a desired two point (BPSK) constellation associated with the output from equalizer 302

Accordingly, as described above, a system, method, and apparatus is disclosed for enabling a constant modulus algorithm (CMA) to be reliably used for blind equalization training, particularly where signals are received in the BPSK format.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
    a finite impulse response (FIR) filter circuit configured to successively supply a plurality of symbols;
    a calculation circuit configured to provide a plurality of coefficients to the FIR filter circuit, the calculation circuit calculating the plurality of coefficients in accordance with a Constant Modulus Algorithm (CMA) and in response to first and second inputs to the calculation circuit, the first input including a first group of the plurality of symbols, and the second input being a plurality of sums; and
    an adder circuit configured to supply the plurality of sums to the calculation circuit, the adder circuit generating the plurality of sums by adding each kth symbol of a second group of the plurality of symbols to a product of each (k−1)th symbol times a number, where k is an integer greater than or equal to 2 and greater than or equal to n, and n is a number of symbols in the second group of the plurality of symbols.

2. An apparatus in accordance with claim 1, wherein the first input is provided to the calculation circuit before the second input is provided to the calculation circuit.

3. An apparatus in accordance with claim 2, wherein the first group of the plurality of symbols includes a predetermined number of the plurality of symbols.

4. An apparatus in accordance with claim 2, wherein the calculation circuit generates each of a plurality of error values based on a corresponding symbol in the first group of the plurality of symbols, the calculation circuit processing the first input for a time period during which each of the plurality of error values is greater than a threshold error value.

5. An apparatus in accordance with claim 1, wherein the second input is provided to the calculation circuit before the first input is provided to the calculation circuit.

6. An apparatus in accordance with claim 1, wherein the plurality of coefficients is a first plurality of coefficients, the calculation circuit calculates the first plurality of coefficients in response to a sum of a second plurality of coefficients and a third plurality of coefficients, the second plurality of coefficients being determined based on the first input and a third plurality of coefficients being determined based on the second input.

7. An apparatus in accordance with claim 1, wherein the FIR filter circuit receives signals indicative of a binary phase shift keying (BPSK) format.

8. An apparatus in accordance with claim 1, further including:
a delay circuit configured to delay said (k−1)th symbol relative to said kth symbol; and
a multiplier circuit configured to generate the product by multiplying the (k−1)th symbol by the number.

9. An apparatus in accordance with claim 1, wherein the number is a complex number.

10. A method comprising:
successively supplying each of a plurality of symbols from a finite impulse response (FIR) filter;
calculating a plurality of coefficients in accordance with a Constant Modulus Algorithm (CMA) and in response to first and second inputs, the first input including a first group of the first plurality of symbols, and the second input being a plurality of sums; and
generating the plurality of sums by adding each kth symbol of a second group of the plurality of symbols to a product of each (k−1)th symbol times a number, where k is an integer greater than or equal to 2 and greater than or equal to n, and n is a number of symbols in the second group of the plurality of symbols.

11. A method in accordance with claim 10, wherein the calculating includes processing the first input in accordance with the CMA before processing the second input with the CMA.

12. A method in accordance with claim 10, wherein the calculating includes processing the second input in accordance with the CMA before processing the first input with the CMA.

13. A method in accordance with claim 10, wherein the plurality of coefficients is a first plurality of coefficients, the calculating including
determining a second plurality of coefficients based on the first input;
determining a third plurality of coefficients based on the second input; and
adding the second and third pluralities of coefficients to provide the first plurality of coefficients.

14. A method in accordance with claim 10, further including:
generating each of a plurality of error values based on a corresponding symbol in the first group of the plurality of symbols; and
processing the first input for a time period during which each of the plurality of error values is greater than a threshold error value.

15. A system, comprising:
a transmitter configured to supply an optical signal;
a receiver configured to receive the optical signal, the receiver including a photodiode that converts the optical signal to an electrical signal;
an analog-to-digital converter circuit configured to receive the electrical signal and supply a first plurality of symbols;
a finite impulse response (FIR) filter circuit configured to successively supply a second plurality of symbols based on the first plurality of symbols;
a calculation circuit configured to provide a plurality of coefficients to the FIR filter circuit, the calculation circuit calculating the plurality of coefficients in accordance with a Constant Modulus Algorithm (CMA) and in response to first and second inputs to the calculation circuit, the first input including a first group of the second plurality of symbols, and the second input being a plurality of sums; and
an adder circuit configured to supply the plurality of sums to the calculation circuit, the adder circuit generating the plurality of sums by adding each kth symbol of a second group of the second plurality of symbols to the product of each (k−1)th symbol times a number, where k is an integer greater than or equal to 2 and greater than or equal to n, and n is a number of symbols in the second group of the second plurality of symbols.

16. A system in accordance with claim 15, wherein the first input is provided to the calculation circuit before the second input is provided to the calculation circuit.

17. A system in accordance with claim 16, wherein the first group of the second plurality of symbols includes a predetermined number of the second plurality of symbols.

18. A system in accordance with claim 16, wherein the calculation circuit generates each of a plurality of error values based on a corresponding symbol in the first group of the second plurality of symbols, the calculation circuit processing the first input for a time period during which each of the plurality of error values is greater than a threshold error value.

19. A system in accordance with claim 15, wherein the second input is provided to the calculation circuit before the first input is provided to the calculation circuit.

20. A system in accordance with claim 15, wherein the plurality of coefficients is a first plurality of coefficients, the calculation circuit calculates the first plurality of coefficients in response to a sum of a second plurality of coefficients and a third plurality of coefficients, the second plurality of coefficients being determined based on the first input and a third plurality of coefficients being determined based on the second input.

21. A system in accordance with claim 15, wherein the optical signal is modulated in accordance with a binary phase shift keying (BPSK) format.

22. A system in accordance with claim 15, further including:
a delay circuit configured to delay said (k−1)th symbol relative to said kth symbol; and
a multiplier circuit configured to generate the product by multiplying the (k−1)th symbol by the number.

23. A system in accordance with claim 15, wherein the number is a complex number.

* * * * *